United States Patent [19]
Toyoda et al.

[11] Patent Number: 5,855,712
[45] Date of Patent: Jan. 5, 1999

[54] METHOD OF REPAIRING AN EXISTING PIPE

[75] Inventors: Shigeru Toyoda, Saitama-ken; Shuichi Yagi; Masaaki Itagaki, both of Kanagawa-ken, all of Japan

[73] Assignee: Tokyo Gas Co. Ltd., Tokyo, Japan

[21] Appl. No.: 707,296

[22] Filed: Sep. 3, 1996

[30] Foreign Application Priority Data

Sep. 6, 1995 [JP] Japan ................................. 7-229165
Sep. 6, 1995 [JP] Japan ................................. 7-229166

[51] Int. Cl.$^6$ .......................... B29C 63/20; B29C 63/36; B29C 63/48
[52] U.S. Cl. ......................... 156/94; 156/287; 156/294
[58] Field of Search ........................... 156/94, 287, 294; 264/36, 269, 36.16, 36.17; 138/97, 98; 427/230, 238

[56] References Cited

U.S. PATENT DOCUMENTS

| | | | |
|---|---|---|---|
| 3,041,204 | 6/1962 | Green | 117/97 |
| 3,494,813 | 2/1970 | Lawrence et al. | 156/294 |
| 4,397,890 | 8/1983 | Kinumoto et al. | 427/238 |
| 4,440,194 | 4/1984 | Kinumoto et al. | 138/97 |
| 4,456,401 | 6/1984 | Williams | 264/36 |
| 4,602,974 | 7/1986 | Wood et al. | 156/287 |
| 4,865,673 | 9/1989 | Shishkin et al. | 156/287 |
| 5,108,533 | 4/1992 | Long et al. | 156/294 |
| 5,202,157 | 4/1993 | Tomoyasu et al. | 427/238 |
| 5,447,664 | 9/1995 | Ito et al. | 264/36 |
| 5,510,078 | 4/1996 | Smith et al. | 156/287 |
| 5,549,856 | 8/1996 | Yokoshima | 138/97 |
| 5,609,186 | 3/1997 | Satake et al. | 138/97 |

FOREIGN PATENT DOCUMENTS

| | | | |
|---|---|---|---|
| 55-21284 | 2/1980 | Japan | 156/294 |
| 60-18127 | 1/1985 | Japan . | |
| 61-283529 | 12/1986 | Japan . | |
| 1-316247 | 12/1989 | Japan | 156/294 |
| 04161325 | 6/1992 | Japan . | |
| 04163025 | 6/1992 | Japan . | |

*Primary Examiner*—Steven D. Maki
*Attorney, Agent, or Firm*—Nikaido Marmelstein Murray & Oram LLP

[57] ABSTRACT

A method of repairing an existing pipe includes steps of introducing at least one leading pig into the existing pipe through one open end thereof, introducing behind the leading pig a necessary amount of adhesive agent into the existing pipe through the same open end thereof, fixing one end of a liner tube at the above open end of the existing pipe, in a manner such that the liner tube may be reversed into the existing pipe, and providing a negative pressure into the existing pipe through an opposite open end thereof to cause the leading pig and the adhesive agent to move forwardly and thus cause the unfixed portions of the liner tube to be reversed into the existing pipe. The adhesive agent is caused to move through the existing pipe in the form of a plug flow, thereby coating the whole internal surface of the existing pipe with the adhesive agent, ensuring that the liner tube reversed into the pipe may adhere to the internal surface of the existing pipe.

7 Claims, 6 Drawing Sheets

METHOD OF REPAIRING AN EXISTING PIPE

BACKGROUND OF THE INVENTION

The present invention relates to a method of repairing an existing pipe, particularly to a method of repairing an existing underground pipe such as a gas pipe by reversing a flexible liner tube into the pipe.

There has been known a method of repairing an existing underground gas pipe by reversing a flexible liner tube into the pipe without trenching on road surface along the pipe. According to this method, at first a belt is introduced into an existing pipe so that one part of the belt is extending through the pipe over the entire length thereof, then another part of the belt is introduced into a flexible liner tube so that this part of the belt is extending through the liner tube along the entire length thereof. Afterwards, a necessary amount of adhesive agent is sealed into the liner tube, and one end of the liner tube is reversed so as to be fixed at one open end of the existing pipe. Subsequently, a pressurized fluid is applied from behind to continuously cause the reversal of the liner tube so that the liner tube may be introduced into the existing pipe. Such a reversal and introduction of the liner tube into the existing pipe can be effectively directed by pulling the above belt which has been in advance introduced into the existing pipe. In this way, the liner tube reversed in the existing pipe can adhere to the pipe internal surface by means of the adhesive agent and pressurized fluid.

The liner tube adhered to the internal surface of the existing pipe is usually made of a flexible gas-impermeable material, therefore it is effective in repairing any corrosion holes and is also effective in preventing any possible damages to the pipe due to an earthquake or the like. However, since the above method involves too many preparation steps before the operation of reversing and introducing a liner tube into an existing pipe, a time period required in the whole operation is relatively long and hence the cost for repairing an existing pipe is comparatively high.

In order to overcome the above problem, Japanese Patent Publication 61-20411 has suggested an improved method as shown in FIG. 7. In the method of FIG. 7, at first a leading block c is introduced into an existing pipe a through an open end b thereof, then an adhesive agent d is introduced into the existing pipe a. Subsequently, one end of a liner tube e is reversed so as to be fixed at the open end b of the existing pipe a. Afterwards, a pressurized fluid is applied from behind to continuously cause the reversal of the liner tube e so that the liner tube e may be introduced into the existing pipe a. In this way, the liner tube e can adhere to the internal surface of the existing pipe a by means of the adhesive agent d and pressurized fluid applied from behind.

In the method shown in FIG. 7, the leading block c is used to prevent the adhesive agent d from moving too fast so as to ensure that the internal surface of the existing pipe a may be coated with the adhesive agent d.

Although a method of FIG. 7 is allowed to dispense with some preparation steps before the operation of reversing and introducing a liner tube into an existing pipe, it is found to have some other problems as concluded in the following.

Firstly, the leading block c and the liner tube e have been proved difficult to pass through bent portions such as elbows along the existing pipe a. Particularly, a reversing/moving liner tube e is prone to stop in the pipe a, or the reversed liner tube e becomes deflected, as a result the liner tube e fails to properly adhere to the internal surface of the existing pipe a.

Secondly, if the leading block c encounters a pipe joint including a socket which usually has a larger diameter than pipe inner diameter, the leading block c is easy to get stuck in a such larger diameter portion. Consequently, the adhesive agent undesirably flows forward through gaps formed between the pipe internal wall and the leading block c.

Thirdly, since the adhesive agent is pushed forward by the reversing/moving liner tube e into which a pressurized pressure is applied from behind, the adhesive agent is apt to be excessively drawn into the space between the reversed liner tube e and pipe internal wall, or the air is easy to be introduced into the adhesive agent, resulting in improper adhesion between the reversed liner tube e and pipe internal wall.

Further, if the leading block c is pulled forward by a towing wire f, it is required that the wire f be in advance introduced into the existing pipe over the entire length thereof, and a towing apparatus is needed to pull the wire f so as to cause the leading block c to move forward. As a result, more equipment is needed and the repairing operation becomes complicated.

Moreover, since the adhesive agent d is pushed forward by the reversing/moving liner tube e, it is quite possible that an adhesive layer between the liner tube e and the pipe internal wall is uneven, resulting in uneven internal surface of the liner tube e adhered to the internal surface of the existing pipe a, as illustrated in FIG. 8A and FIG. 8B.

SUMMARY OF THE INVENTION

An object of the present invention is to solve the above-mentioned problems peculiar to the above-mentioned prior arts by providing an improved method which is effective for repairing an existing pipe using only simple equipment and requiring only a shortened time.

According to the present invention, there is provided a method of repairing an existing pipe, which comprises introducing at least one leading pig into the existing pipe through one open end thereof, introducing behind the leading pig a necessary amount of adhesive agent into the existing pipe through the same open end thereof, fixing one end of a liner tube at the above open end of the existing pipe in a manner such that the liner tube may be reversed into the existing pipe, and providing a negative pressure into the existing pipe through an opposite open end thereof to cause the leading pig and the adhesive agent to move forwardly and thus cause the unfixed portions of the liner tube to be reversed into the existing pipe. The adhesive agent is caused to move through the existing pipe in the form of a plug flow, thereby coating the whole internal surface of the existing pipe with the adhesive agent, ensuring that the liner tube reversed into the pipe may adhere to the internal surface of the existing pipe.

In one aspect of the present invention, the leading pig is made of an elastic material such as sponge and formed into a spherical shape having a diameter slightly larger than the inner diameter of the existing pipe.

Further, the leading pig may be made of a rubber material having numerous continuous bubbles therethrough, thereby permitting air to escape forward through these continuous bubbles if the air is remaining within the adhesive agent.

In another aspect of the present invention, a plurality of the leading pigs may be introduced into the existing pipe before introducing the adhesive agent.

In a further aspect of the present invention, the other end of the liner tube is connected with a wire which is for use in enabling the liner tube to pass through bent portions of the existing pipe.

In a still further aspect of the present invention, a suction apparatus having a pressure detector and control valve is used to provide the negative pressure into the existing pipe.

In a more specific aspect of the present invention, a lining pig is introduced into the existing pipe behind the adhesive agent, so that the lining pig is interposed between the adhesive agent and liner tube while moving through the existing pipe.

The above objects and features of the present invention will become more understood from the following description with reference to the accompanying drawings.

DETAILED DESCRIPTION OF THE PREFERRED EMBODIMENTS

Figure 1:
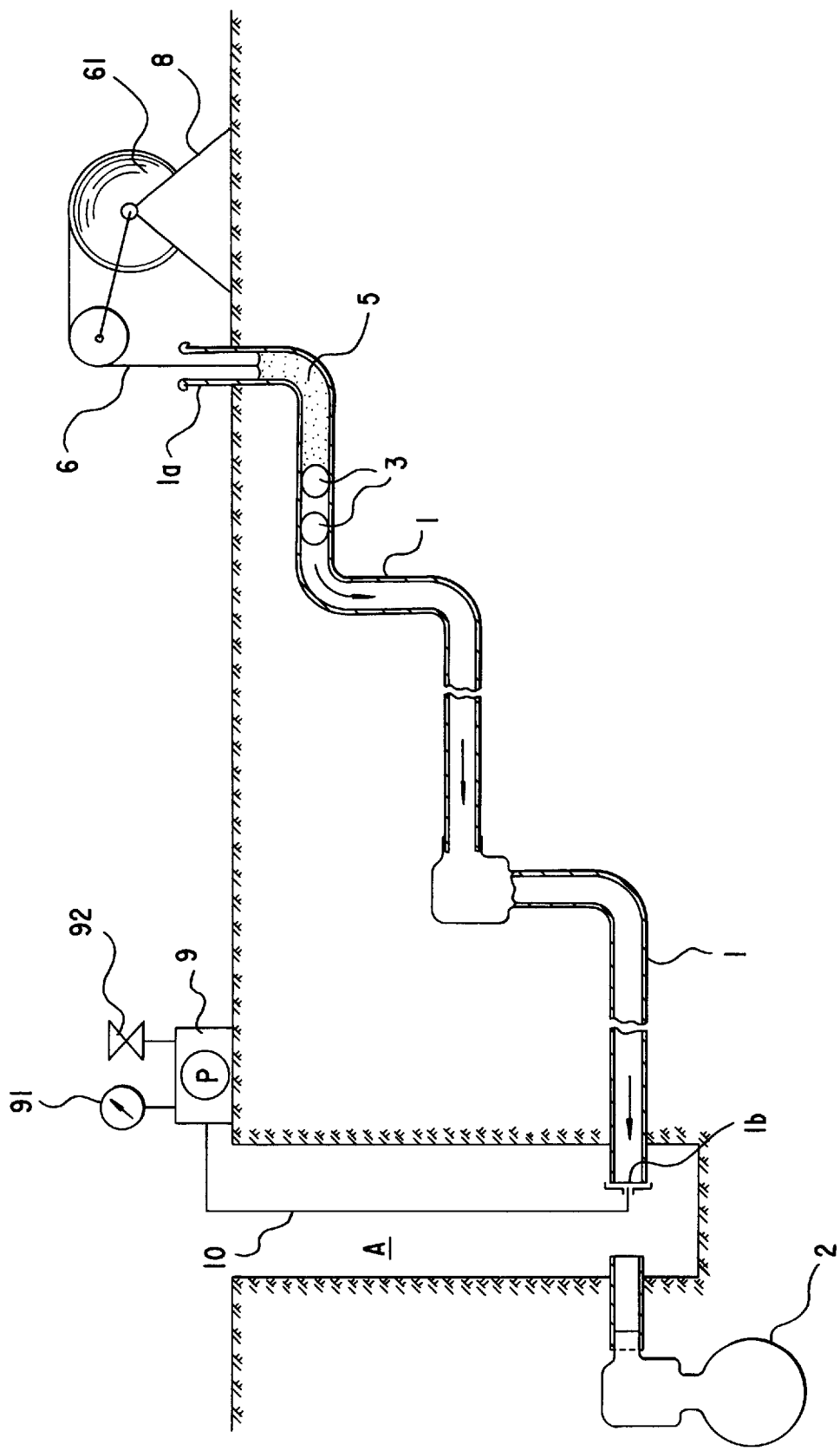
FIG. 1 is an explanatory view showing an embodiment of the method according to the present invention.

Referring to FIG. 1, reference numeral 1 represents an existing gas service pipe which has been buried underground for many years and is to be repaired in the method of the present invention. Reference numeral 2 represents a gas main which is connected with the existing gas service pipe 1. In the following description, the existing gas service pipe 1 is referred to as existing pipe.

As shown in FIG. 1, the existing pipe 1 may involve elbows, bends and sockets along the entire length thereof. In order to repair the existing pipe 1 using the method of the present invention, a pit A is dug and pipe cutting is performed to separate the existing pipe 1 from the gas main 2. At first, a leading pig 3 is introduced into the existing pipe 1 through an open end 1a thereof. Then, an amount of an adhesive agent 5 required to coat the pipe internal wall is introduced behind the leading pig 3 into the pipe 1. Afterwards, one end of a liner tube 6 is reversed so as to be fixed at the open end 1a of the existing pipe 1.

Here, the leading pig 3 is made of an elastic material such as sponge, and is formed into a spherical shape having a diameter slightly larger than the inner diameter of the existing pipe 1. If necessary, a plurality of pigs 3 may be introduced into the existing pipe 1 prior to introducing the adhesive agent 5. In this manner, if one pig 3 drops and get stuck in a larger diameter portion or a tee of the pipe 1, other pig(s) 3 is sure to continue moving as desired.

The liner tube 6 is a flexible and reversible tube which includes an inner fiber layer and an outer elastomer layer. Before reversal into the existing pipe 1, the liner tube 6 is in flat form and wound around a reel 8. The other end of the liner tube 6 is connected with a wire 61 which is also wound around the reel 8.

Meanwhile, a suction apparatus 9 is connected through a hose 10 to the other open end 1b of the existing pipe 1. The suction apparatus 9 has a pressure gauge 91 and a suction force adjusting valve 92.

The suction apparatus 9 is then operated to provide a negative pressure into the pipe 1, so that the leading pig 3 and adhesive agent 5 are caused to move toward the open end 1b of the existing pipe 1, enabling the liner tube 6 to be reversed and introduced into the pipe. After reversal into the existing pipe 1, the outer elastomer layer of the liner tube 6 will become a inner layer and the inner fiber layer thereof will become an outer layer which is in contact with the internal wall of the existing pipe 1.

While the leading pig 3 and the adhesive agent 5 are moving in the existing pipe 1 toward the open end 1b thereof, the leading pig 3 serves not only as a leading means for leading the adhesive agent 5 and the liner tube 6, but also as a blocking means to prevent the adhesive agent 5 from moving too fast, thereby keeping a plug flow of the adhesive agent 5 through the pipe 1. In this way, the internal wall of the existing pipe 1 is exactly coated with the adhesive agent 5, ensuring that the liner tube 6, once reversed, can adhere to the internal wall of the existing pipe 1.

Figure 2:
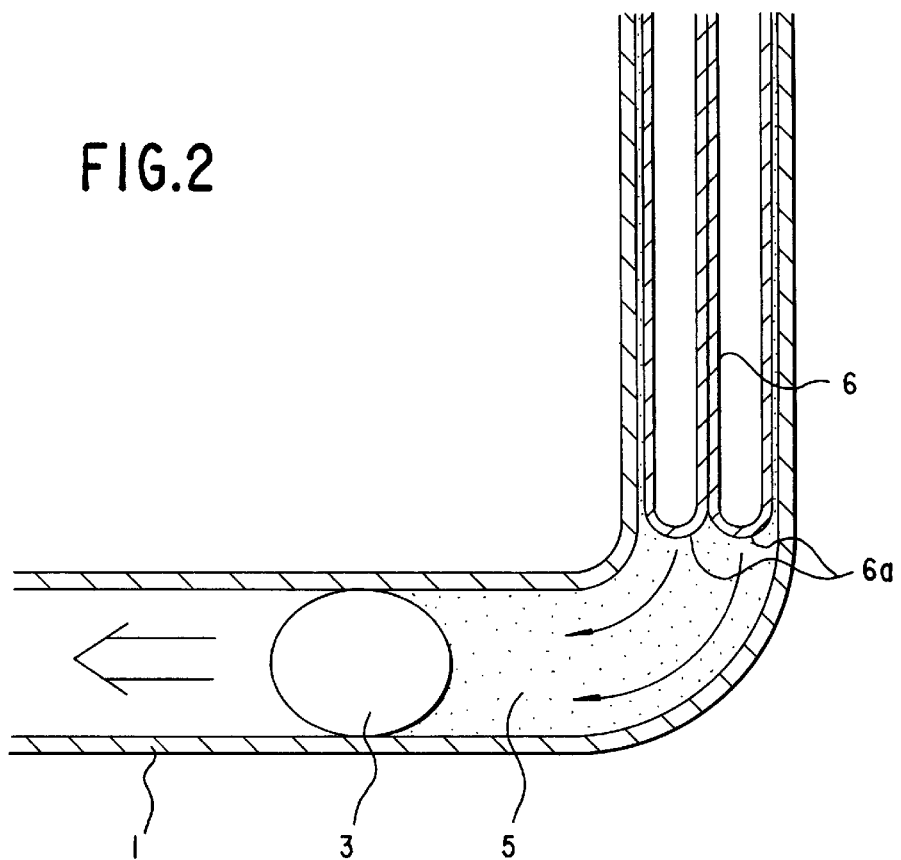
FIG. 2 is a cross sectional view showing how a bent portion of an existing pipe is treated in the method of the present invention.

Referring to FIG. 2, the adhesive agent 5 in moving is also in contact with reversing portions 6a of the liner tube 6, thus ensuring a more exact adhesion between the reversed liner tube 6 and the internal wall of the existing pipe 1.

Referring again to FIG. 2, since a negative pressure is used to effect the movement of the pig 3, the adhesive agent 5, and the reversing movement of the liner tube 6, an overall movability of these objects through the existing pipe 1 is improved as compared with a conventional method where a pressurized fluid is applied from behind. Thus, it is possible to ensure a smooth movement of the pig 3 and the adhesive agent 5, and also to ensure a smooth reversing movement of the liner tube 6, even at bent portions of the existing pipe 1.

Figure 3:
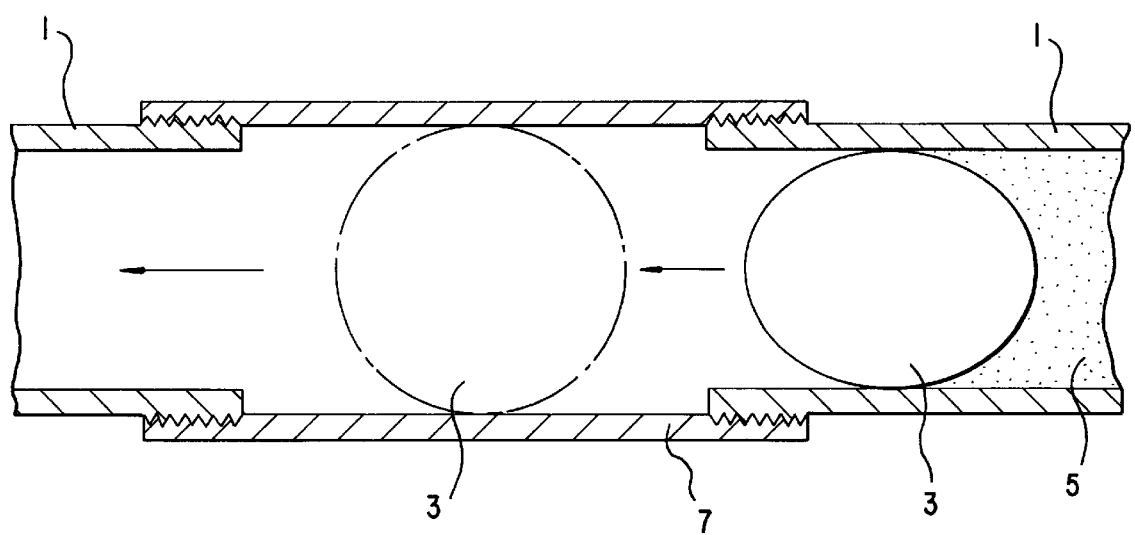
FIG. 3 is a cross sectional view showing how a larger diameter portion of an existing pipe is treated in the method of the present invention.

Referring to FIG. 3, since the leading pig 3 is made of an elastic material such as sponge and is formed into a spherical shape having a diameter slightly larger than the inner diameter of the existing pipe 1, it is possible for the pig 3 to keep its effective sealing against the pipe internal wall even when the pig 3 arrives at a slightly larger diameter portion 7. Accordingly, even at a slightly larger diameter portion 7, there would be no gaps formed between the outer surface of the spherical pig 3 and the internal wall of the existing pipe 1, thus ensuring that no adhesive agent would undesirably flows forward through these gaps.

Further, the leading pig 3 may also be made of a rubber material having numerous continuous bubbles therethrough, thereby permitting air to escape forward through these continuous bubbles if the air is remaining within the adhesive agent.

In addition, since the leading pig 3 is made of a sponge which is excellent at absorbing water, it is possible for the pig 3 to absorb water drops remaining on the pipe internal wall, thereby ensuring an effective adhesion between the liner tube 6 and the internal wall of the existing pipe 1.

Figure 4:
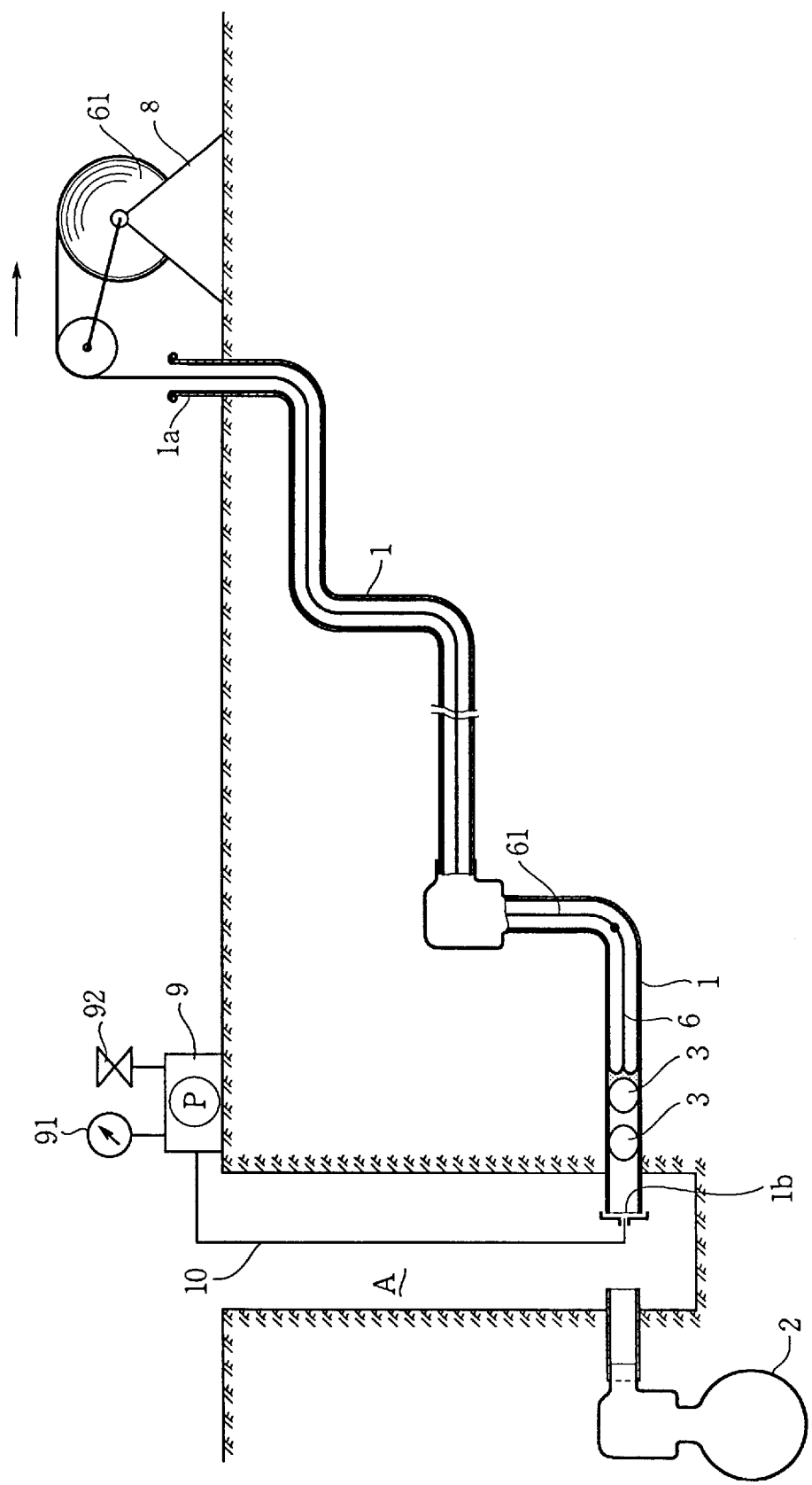
FIG. 4 is an explanatory view illustrating in more detail the embodiment shown in FIG. 1.

Referring to FIG. 4, if the existing pipe 1 does involve many bent portions along the length thereof, there will be some difficulties in effecting the movement of the pig 3, the adhesive agent 5, and the reversing movement of the liner tube 6 through the existing pipe 1. At this moment, the suction force adjusting valve 92 is operated to reduce the suction force being applied into the existing pipe 1 through the open end 1b thereof. Meanwhile, the wire 61 is pulled backwardly a little to cause the liner tube 6 to move back a short distance. Then, the valve 92 is again operated to suddenly raise the suction force so as to enable the liner tube 6 to be reversed and moved through such bent portions.

Figure 5:
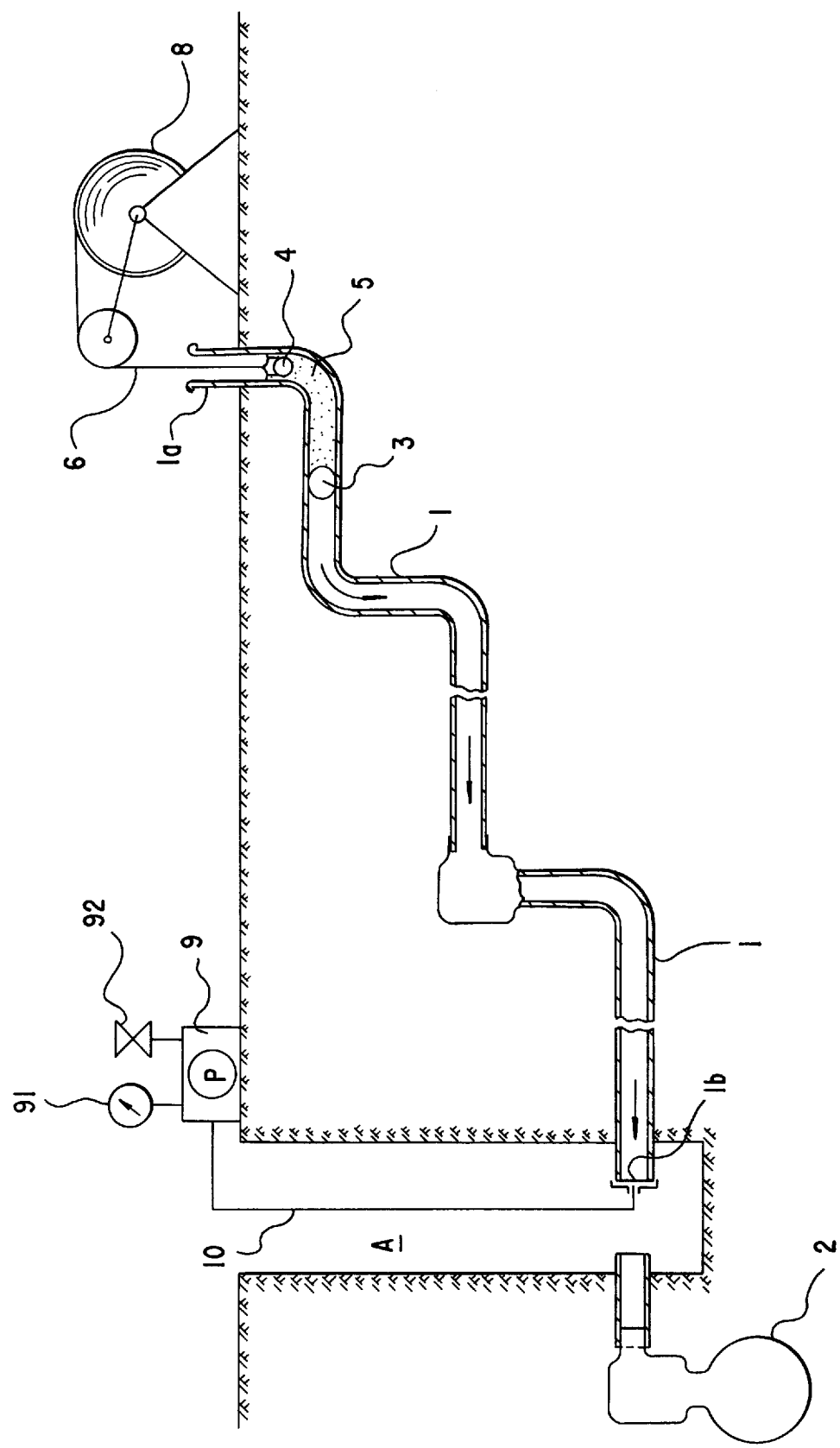
FIG. 5 is an explanatory view showing another embodiment of the method according to the present invention.

FIG. 5 shows another embodiment of the method according to the present invention. As shown in FIG. 5, a lining pig 4 is introduced into the existing pipe 1 behind the adhesive agent 5, so that the lining pig 4 is interposed between the plug flow of the adhesive agent 5 and the liner tube 6 while moving through the existing pipe 1.

Figure 6B:
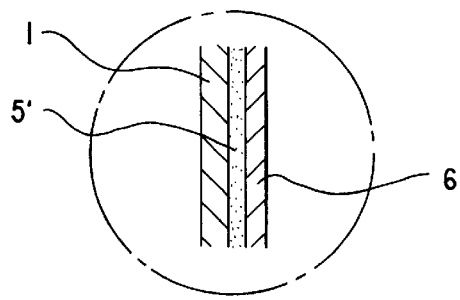
FIG. 6B is an enlarged view of a portion of FIG. 6A.
Figure 6A:
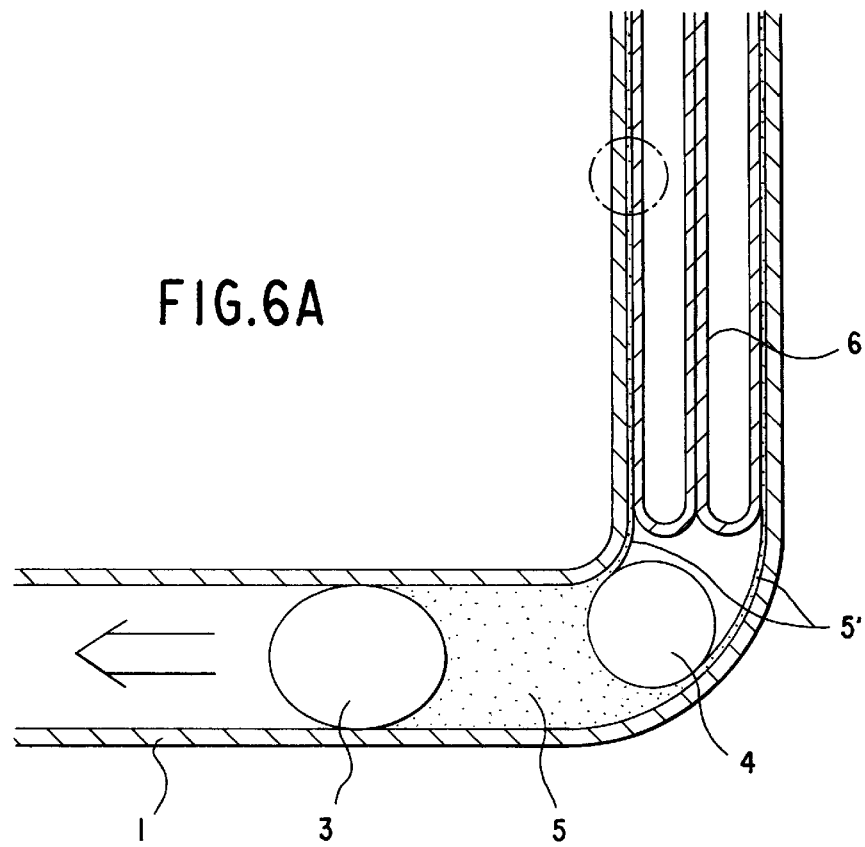
FIG. 6A is a cross sectional view showing how a bent portion of an existing pipe is treated in the embodiment of FIG. 5.
Figure 7:
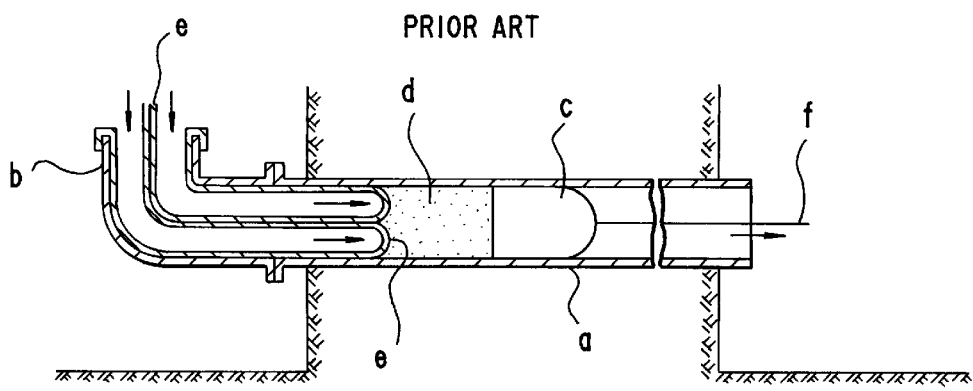
FIG. 7 is a cross sectional view showing a conventional method of repairing an existing pipe.
Figure 8A:
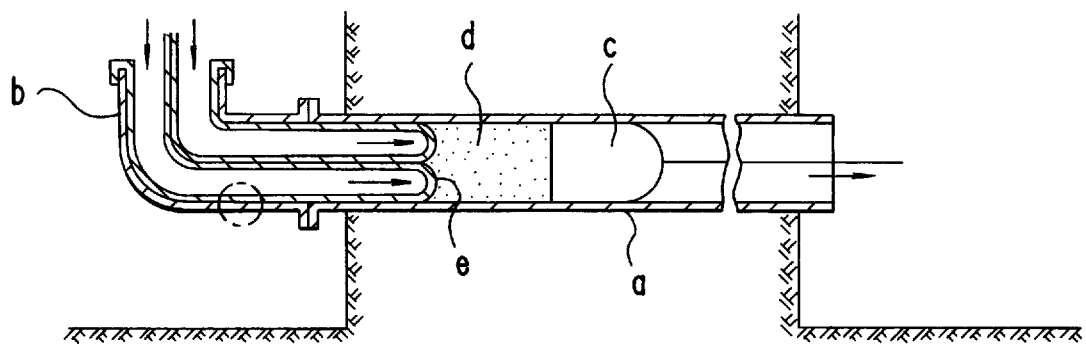
FIG. 8A is a cross sectional view showing in more detail the conventional method of FIG. 7.
Figure 8B:
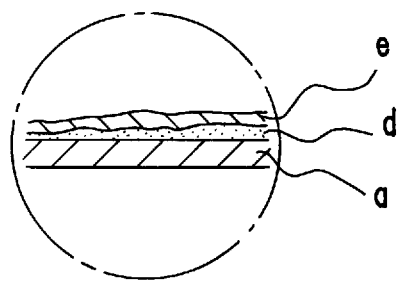
FIG. 8B is an enlarged view of a portion of FIG. 8A.

Referring to FIG. 6A and FIG. 6B, with the use of the lining pig 4, a uniform adhesive layer 5' of the adhesive agent 5 is formed on the internal wall of the existing pipe 1. Therefore, it is sure that an adhesive layer between the liner tube 6 and the pipe internal wall is even, ensuring an even internal surface of the liner tube 6 adhered to the internal surface of the existing pipe 1.

As can be understood from the above description, the method according to the present invention is sure to provide at least the following effects or improvements over conventional methods.

(1) Since a negative pressure rather than a pressurized fluid is employed during the whole operation, a leading pig, a plug flow of an adhesive agent can move smoothly through an existing pipe along the entire length thereof, thus effecting a smooth reversing/moving of a liner tube in the existing pipe which is being repaired.

(2) Since a negative pressure rather than a pressurized fluid is employed during the whole operation, a leading pig, a plug flow of an adhesive agent can move smoothly through bent portions of an existing pipe which is being repaired, thus effecting a smooth reversing/moving of a liner tube even at bent portions of the pipe.

(3) Since a negative pressure is employed, the whole operation can be finished with the use of simple equipment.

(4) Since the leading pig is made of an elastic material such as sponge and formed into a spherical shape having a diameter slightly larger than the inner diameter of the existing pipe, it is possible for the leading pig to keep its effective sealing against the pipe internal wall even when the leading pig arrives at a slightly larger diameter portion of the pipe. Accordingly, even at a slightly larger diameter portion of an existing pipe, there would be no gaps formed between the outer surface of the spherical pig and the internal wall of the existing pipe, ensuring that no adhesive agent would undesirably flow forward through these gaps.

(5) Since the leading pig may be made of a rubber material having numerous continuous bubbles therethrough, it is possible for air to escape forward through these continuous bubbles if the air is remaining within the adhesive agent.

(6) Since the leading pig is made of a sponge which is excellent at absorbing water, it is possible for the leading pig to absorb water drops remaining on the pipe internal wall, thereby ensuring an effective adhesion between the liner tube and the internal wall of an existing pipe.

(7) If a lining pig is employed so that it is interposed between the plug flow of an adhesive agent and the liner tube while moving through an existing pipe, it is sure that an adhesive layer between the liner tube and the pipe internal wall is even, ensuring an even internal surface of the liner tube adhered to the internal surface of the existing pipe.

While the presently preferred embodiments of the this invention have been shown and described above, it is to be understood that these disclosures are for the purpose of illustration and that various changes and modifications may be made without departing form the scope of the invention as set forth in the appended claims.

What is claimed is:

1. A method of repairing an existing pipe, comprising the steps of:

introducing at least one leading pig into the existing pipe through one open end thereof;

introducing behind the leading pig a necessary amount of adhesive agent into the existing pipe through the same open end thereof;

fixing one end of a liner tube at the open end of the existing pipe, in a manner such that the liner tube may be reversed into the existing pipe and connecting the other end of the liner tube with a wire which is used for enabling the liner tube to pass through bent portions of the existing pipe; and providing a negative pressure into the existing pipe through an opposite end thereof to cause the leading pig and the adhesive agent to move forwardly and to cause the unfixed portions of the liner tube to be reversed into the existing pipe;

wherein the method further includes the steps of
reducing a suction force caused by the negative pressure;
pulling back on the wire causing the liner tube to move back a short distance; and
suddenly raising the suction force to enable the liner tube to reverse and move through a bent portion of the existing pipe;
wherein the adhesive agent is caused to move through the existing pipe in the form of a plug flow which coats the whole internal surface of the existing pipe with the adhesive agent which ensures that the liner tube reversed into the pipe adheres to the internal surface of the existing pipe.

2. The method according to claim 1, further comprising the step of making the leading pig of an elastic material.

3. The method according to claim 2, further comprising the step of making the leading pig of a rubber material having numerous bubbles therethrough, and permitting air to escape forward through said bubbles from air remaining within the adhesive agent.

4. The method according to claim 1, 2 or 3, further comprising the step of forming the leading pig into a spherical shape having a diameter slightly larger than the inner diameter of the existing pipe.

5. The method according to claim 1, further comprising the step of introducing a plurality of the leading pigs into the existing pipe before introducing the adhesive agent.

6. The method according to claim 1, further comprising the step of using a suction apparatus having a pressure detector and control valve to provide the negative pressure into the existing pipe.

7. The method according to claim 1, further comprising the step of introducing another lining pig into the existing pipe behind the adhesive agent, so that the another lining pig is interposed between the adhesive agent and liner tube while moving through the existing pipe.

* * * * *